UNITED STATES PATENT OFFICE.

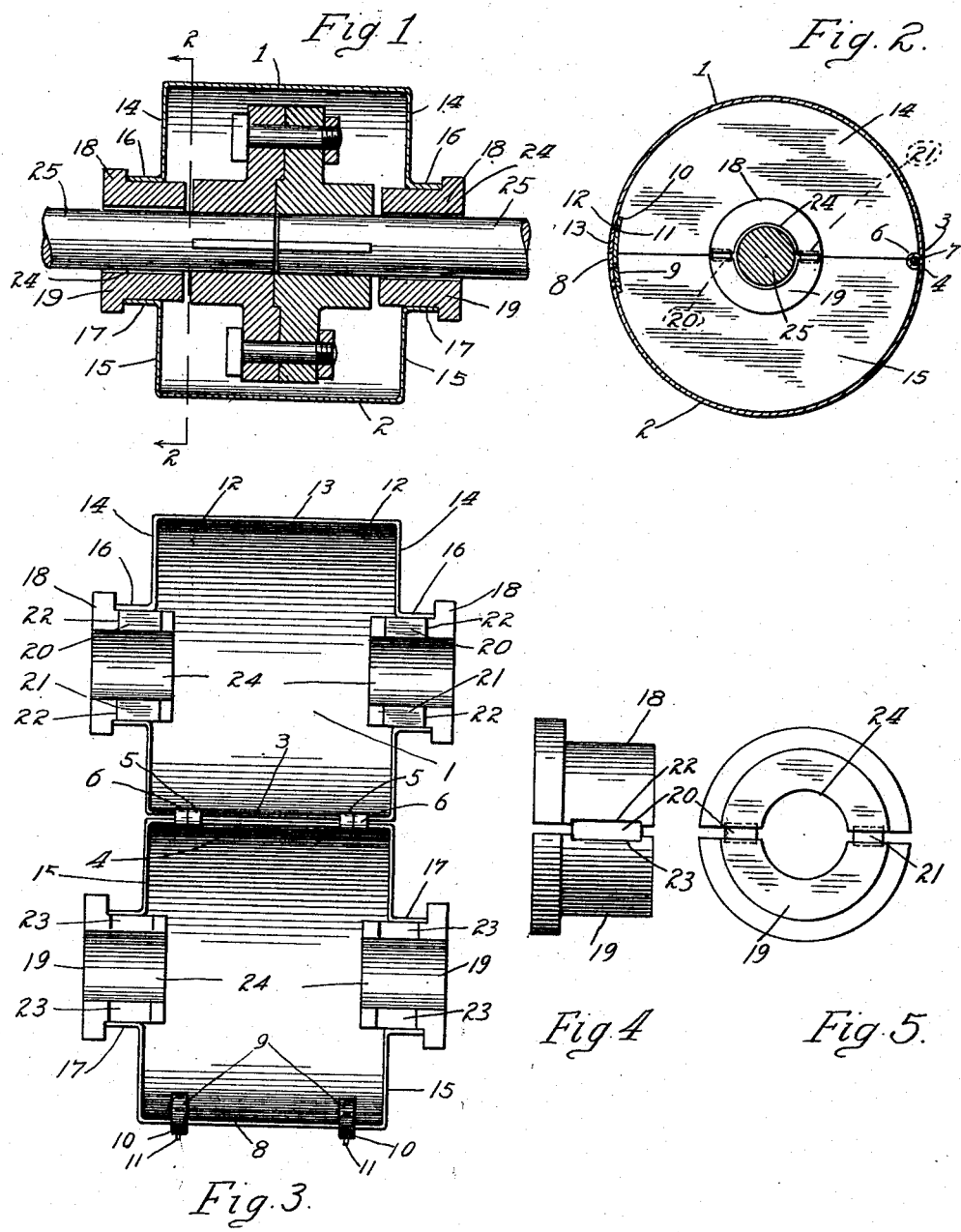

CHARLES E. PELTON, OF MILWAUKEE, WISCONSIN.

COUPLING OR SHAFT COVER.

1,192,342.  Specification of Letters Patent.  Patented July 25, 1916.

Application filed August 11, 1915. Serial No. 45,069.

*To all whom it may concern:*

Be it known that I, CHARLES E. PELTON, a citizen of the United States, residing at Milwaukee, in the county of Milwaukee and State of Wisconsin, have invented a new and useful Improvement in Coupling or Shaft Covers, of which the following is a specification.

My invention relates to safety devices adapted to be used on revolving shafts or machinery in mills and factories to protect employees and others from injury caused by accidental contact with said revolving shafts or machinery.

The object of my invention is to provide a covering for revolving shafts and other devices attached to said shafts which may be easily placed thereon and secured in position and which shall be free to revolve with or upon said shafts to provide suitable means for protection against accidental contact with said revolving shafts and devices by interposing a covering which will cease to revolve when the exterior surface thereof is brought into contact with any person or stationary object. I attain these objects by the device illustrated in the accompanying drawing, in which—

Figure 1 shows a sectional elevation of the device mounted in operative position on the ends of shafts, which are secured together by a shaft coupling. Fig. 2 shows a section on the line 2—2 of Fig. 1. Fig. 3 shows the device in opened position and ready to be secured over any shaft or attached machinery. Fig. 4 shows a side elevation of a detail part of my device. Fig. 5 shows an end view of said detail part.

Referring to Figs. 1 and 2, I provide a cylindrical covering composed of an upper half shell 1 and a lower half shell 2 secured together at one edge 3 and 4 thereof by suitable hinges 5 and 6, which are formed on the half shells 1 and 2 and connected by the hinge pins 7. At the edge 8 of the half shell 2 are secured the spring clips 9, whose projecting end 10 has secured thereto a pin 11 which is adapted to engage with a hole 12 near the edge 13, in the half shell 1. Suitably formed sidewalls 14 are formed on each side of the half shell 1, which register and meet with the sidewalls 15, of the half shell 2, on the approximate center line of said shells 1 and 2, said sidewalls 14 and 15 having formed concentrically with said shells 1 and 2, the projecting half rings 16 and 17 into which fit the half bushings 18 and 19, which are held apart by the keys 20 and 21 fitted into the recesses 22 and 23 in said half bushings 18 and 19 and provide means for producing a stress between the half shell 1 and the half shell 2 to hold the pins 11 on the end 10 of the spring clips 9, into rigid engagement with the hole 12 in the half shell 1 and securing the half bushings 18 and 19 within the half rings 16 and 17 by frictional contact. The half bushings 18 and 19 form by their inner periphery a hole 24 of sufficiently larger diameter than the shaft upon which they are placed to prevent any frictional contact with the shaft 25 upon which same is mounted, and may be provided with any suitable means to accomplish this result. Said half bushings may also be made interchangeable to fit any size of shafts.

In use these coupling or shaft covers may be made of any suitable material or in any desired size or length and may be secured over revolving shafts, to house couplings, or any other objects which tend to produce accidental injury or damage to persons or equipment in mills, factories or other places where such devices are in operation, by simply hinging the cover, of suitable form equipped with proper bushings, over the shaft or device to be protected and snapping the pins 11 attached to the catch 9 on the half shell 2, into the holes 12 on the half shell 1. This device may also be used to cover a length of revolving shaft on which may be thrown the loop of an endless belt off a pulley attached to said shaft to protect same from frictional wear, or it may be used where any object such as a rope or a belt is to be dragged over said revolving shaft to prevent the same from becoming wound thereon or rotated thereby.

It will be understood that under certain conditions the bushings 19 may be dispensed with, and the device may be supported merely by bearings formed by the cut away ends of the half shells. This arrangement does not provide an interchangeable bearing, but may be preferable under certain conditions where the couplings are to be used in connection with constant sizes of shafts and wherein it is desired to reduce the cost of the device to a minimum.

Having thus described my invention what

I claim and desire to secure by Letters Patent, is:—

1. A device of the class described comprising two half shells suitably secured together and means for mounting said half shells on revolving shafts or the like, to provide a covering therefor, for protection against accidents caused by contact with objects carried thereby, said means being interchangeable to fit required conditions of support.

2. In a device of the class described two half shells, means for securing them together, interchangeable half bushings adapted to be held by the end terminals of the shells, and keys inserted between said bushings to provide a stress within the structure, to hold the same in locked condition and to hold said bushings free from binding contact with revolving shafts upon which the same may be mounted.

3. In a device of the class described, a shell to be mounted over revolving objects, adapted to form a protecting covering therefor, in combination with means for providing an interchangeable mounting for said shell, to hold said shell approximately concentric with said revolving objects and free to revolve upon the same.

4. In a device of the class described, in combination with half shells suitably secured together, whose end terminals are formed concentric with the periphery thereof, suitable bushings held by said terminals and means for holding said bushings in frictional contact with said end terminals and to prevent binding contact with shafts or other rotatable objects upon which the same may be mounted.

5. A device of the class described comprising two half shells, connected together, interchangeable half bushings adapted to engage with the end terminals of the shells and provided in opposite faces with recesses, and key members engageable in the recesses to produce a stress between said half shells whereby the bushings are held in position and held separate to prevent binding contact with revolving shafts or the like upon which the device may be mounted.

In testimony whereof I hereunto affix my hand in the presence of two subscribing witnesses.

CHARLES E. PELTON.

Witnesses:
JOHN BRAUNWALDER,
CORA SCHMIERER.

Copies of this patent may be obtained for five cents each, by addressing the "Commissioner of Patents. Washington, D. C."